Patented Jan. 9, 1945

2,366,813

UNITED STATES PATENT OFFICE 2,366,813

RESINOUS SUBSTANCES AND PROCESS OF PREPARATION

Tor Smedslund, Helsingfors, Finland, assignor to Johan Bjorksten, Chicago, Ill.

No Drawing. Application June 9, 1941,
Serial No. 397,209

4 Claims. (Cl. 260—82)

This invention relates to compositions of matter, and to methods of preparing such compositions, and more particularly to varnishes, lacquers, resins and impregnating agents prepared from inexpensive hydrocarbon products.

One of the objects of the invention is to provide an improved method of preparing a varnish-like drying solution of hydrocarbon resins from inexpensive hydrocarbon materials, which solutions when exposed to the atmosphere or air, dry to form hard tenacious films of good adhesion to glass, metals and the like surfaces. The process of manufacture of the solutions does not generally involve the step of separating or removing any heavy oil, or soft resin fraction from the reaction product.

Another object of this invention is to provide a method for preparing inexpensive resins from hydrocarbon products, in much higher yield than has been possible heretofore.

Another object is to provide varnishes and impregnation compositions which have exceptional repellent properties for forms of organic life, which attack fibrous organic materials.

Another object of my invention is to prepare, by an improved method, drying solutions of hydrocarbons.

A further object is to prepare new and useful synthetic resins from inexpensive hydrocarbons.

Further objects and advantages of this invention will become apparent from the following detailed disclosure.

Resins obtained by chlorinating various hydrocarbon materials, and by then contacting them with polymerization catalysts of the Friedel-Craft type are disclosed in several patents and in co-pending patent applications. U. S. P. 2,038,558 to Fulton and Kunc, and U. S. P. 2,052,172 to Frolich, contemplate resins obtained by chlorinating the highly cyclic high boiling tar fractions from cracking coil tar, and subsequent condensation with Friedel-Craft type catalysts; U. S. P. 2,083,883 to Waterman contemplates reacting chlorinated hydrocarbons with non-chlorinated cyclic materials; the co-pending applications, Serial Nos. 364,752 and 213,185, filed November 7, 1940, and June 11, 1938, respectively, contemplate chlorinating, substantially till saturation, gasoline like petroleum fractions, and subsequently polymerizing them with Friedel-Craft type catalysts.

In all of these patents or patent applications chlorination is carried out in the absence of catalysts. I have now found that if a hydrocarbon material, preferably liquid at ordinary pressure and having a bromine number from 0 upwards, is chlorinated in the presence of a chlorination catalyst then the chlorination easily may be carried to a point substantially beyond the point of saturation, whereby I mean the point where there are substantially no double bonds left in the molecule. This additional chlorination, which proceeds very slowly in the absence of catalysts, is particularly marked in the case of hydrocarbon materials containing appreciable amounts of aromatic compounds, but is also noticeable with hydrocarbon materials of purely aliphatic character.

Now, I have found that if such post-saturation chlorination in the presence of catalysts is carried out until the chlorine content in the reaction mixture is of the order of 30 per cent or more and the material is subsequently polymerized under the influence of a Friedel-Craft type catalyst, until substantial cessation of the evolution of hydrogen chloride, new resinous materials are obtained, characterized by higher chlorine content than any of the petroleum resins from hydrocarbons previously known, and that the yield of useful resinous material from any one of these materials is very substantially increased, and may even be doubled. In some cases, however, I may prefer to chlorinate to a lesser extent, for example, to a chlorine content of only 10%.

The catalyst may be present as such at the beginning of the reaction. However, I very often find it advantageous to employ at the outset only a metal, such as copper, aluminum or magnesium powder, which on contact with the hydrochloric acid liberated upon interaction of the chlorine upon the hydrocarbon material present, form catalytically active metal chlorides. In this manner, a relatively smaller amount of the more active chloride catalyst is present in the initial stages of the reaction, where a strongly exothermic reaction might otherwise take place, and the largest amount of chloride catalyst will be present at the final stages of the reaction, when more strongly catalytic action is desirable. Thus, by using metal powder as a catalyst in preference to the corresponding metal chloride, a more smoothly occurring reaction is obtained, and in many instances, the product appears to be more closely controllable and of superior properties, particularly in regard to drying properties and hardness.

On completion of the polymerization reaction, the catalyst is preferably removed, for example with water, ammonia, hydrated lime or hydrochloric acid. Any remaining unreacted solid material, such as for example, aluminum, iron powder, or the like, may be removed, for example by sedimentation, filtration, centrifugation, or the like. To facilitate these operations, the viscosity of the product may be reduced by adding a diluent or thinning solvent, such as a fraction of cracked petroleum, or any other material of similar solvent properties. In general, the product is readily miscible with all low-boiling petroleum solvents containing substantial amounts of unsaturated and/or aromatic hydrocarbons or derivatives.

The product thus obtained by the preferred process is a drying solution of solid hydrocarbon resinous material, or a varnish like material, which upon application to glass, metals, wood, and the like, and upon exposure to the atmosphere, yields a hard tenacious film of good adhesion. When intermixed with a small amount of a drying oil, such as linseed oil, the resulting composition forms a good baking lacquer. It is adapted to admixture with pigments or other paint ingredients to produce paint compositions, of resistance to mold and other forms of organic life superior to that of any other form of resins known to me. The superiority in this regard may be due to the large amounts of halogen which is contained in cyclic nuclei of the resins of this invention, and which by far exceeds the amount of similarly bound halogen in any of the petroleum resins previously known.

In accordance with the present invention, substantially higher yields of resin are obtained from any given raw material than have been possible by any of the methods known heretofore, for example, by this invention, it is possible to convert to a solid resin 85% of a vapor phase cracked gasoline boiling between 30 and 220 degrees C., while by the best methods known heretofore (e. g. Waller and Gustafsson, Serial No. 213,185, filed June 11, 1938, Example No. 1) it has been possible to convert approximately 60% of the same raw material to a resin.

Various aspects of my invention are illustrated in the following examples. As is apparent from the foregoing, the invention is capable of great variation, and is not limited to the particular raw materials, procedures and manipulative steps set forth in the examples.

*Example 1*

100 parts by weight of a fraction of vapor phase cracked petroleum, boiling between 30° and 220° C. at atmospheric pressure and having a bromine number of 0.561 and a specific gravity of 0.862, were chlorinated under vigorous agitation by induction of gaseous chlorine at a temperature between $-10°$ and $\pm 0°$ C. in the presence of 6 parts by weight of aluminum powder. After 5 hours of chlorination the increase in weight was 50 parts. The chlorination then was continued at a temperature between 20° and 30° C. until no more evolution of heat could be observed. The total increase in weight was 72 parts. Considerable quantities of hydrogen chloride were evolved during this phase of the process. The polymerization reaction was brought to completion by heating to 70° C. for 2 hours. The resulting, viscous product was diluted with 50 parts by weight of the non-chlorinated fraction used as the original raw material, whereupon to the dark liquid were added in two portions, with agitation a mixture of 12 parts by weight of hydrated lime and 18 parts of water were added in two portions while agitating the mixture. After a few hours the salts were precipitated and the upper layer consisting of a translucent reddish brown oil was poured off. A sample of this resin solution applied to a surface, dried within half a day to form a hard, tenacious film of good adhesion to glass, concrete, gypsum, metals and like surfaces and which was resistant to water, acids and alkalies. Upon admixture of pigments such as lithopone, iron oxide, aluminum powder, and the like, the drying time of the resin solution was greatly reduced. Volatile constituents were removed by evaporation at a temperature of 200° C. at first at ordinary pressure then at a pressure of 10 mm. mercury. The yield was 88 parts by weight of a brown resin completely soluble in benzol, carbon tetrachloride and ethyl acetate and partly soluble in solvent naphtha. In this example, the chlorination was carried out by induction of gaseous chlorine and in darkness. No appreciable difference in the end product was observed, however, when the chlorination was carried out in light or in darkness or with liquid chlorine, or by other chlorination methods known to the art, provided that the chlorination conditions are anhydrous. These experiences with different methods of chlorination indicate that wide variations in the procedure of chlorination may be employed without greatly affecting the character of the product.

In the above example the quantity of catalyst is 6% by weight of the raw material. This quantity, however, may be greatly varied. In some cases, especially when neither the hydrocarbon mixture used as raw material nor its chlorination products are solvents for the aluminum chloride compounds formed by the chlorination, the aluminum particles will be covered with a layer of the tar-like addition compounds preventing their interior from taking part in the reaction. In such cases ample quantities of catalyst may be useful. The quantity of catalyst may have a certain influence not only upon the time of reaction and upon the yield but also upon the quality of the final product. For example, when using the same hydrocarbon mixture as raw material and chlorinating it in the presence of only 0.6% by weight of aluminum a product is obtained which, when applied to a surface dries very slowly and remains tacky for weeks. Such a product has a higher chlorine content and is satisfactory for use as a vermin repellent, as a moldicide in paints or as a plasticizer.

When using metals forming chlorides of lesser efficacy as condensation catalysts than aluminum chloride, such as iron, zinc, magnesium or copper, greater quantities may be needed. This however, is entirely depending upon the character of the raw material employed. Some suggestions are made in the following examples.

From the foregoing it is apparent that the amount of catalyst may be varied according partly to the properties of the raw material and partly according to the properties which are desired in the final product. From 1% to 6% of aluminum may be advantageously employed and even lower or higher proportions to suit particular requirements, but usually I prefer to employ about 2% to 4% of aluminum or equivalent proportions of other catalysts of similar action.

During the chlorination, the temperature of the mixture rises. Generally it is preferable to carry out the chlorination at a temperature as high as possible, partly because the time of operation will be shorter and partly because the product formed at a higher temperature of polymerization will have more desirable properties as to yield, hardness, speed of drying and water resistance. Practically, the temperature of reaction at the outset is limited to that where the hydrocarbon material begins to boil. Generally, however, this temperature rises as the chlorination proceeds, thus allowing the temperature of reaction to be increased if desired. A low temperature of reaction, such as 0° C. or lower, may advantageously influence some properties of the final product, for example color and plasticity, and may therefore be considered. The range of from about 20° C. to about 60° C. is, in general, a practical range for the polymerization, although deviations from this range may be desirable for particular purposes as indicated above.

Evolution of hydrogen chloride begins when the unsaturated hydrocarbons present have become saturated by the addition of chlorine, and when chlorine thus begins to substitute hydrogen. If the raw material consists exclusively of saturated hydrocarbons, evolution of hydrogen chloride starts immediately. This evolution increases as greater quantities of the Friedel-Craft type catalyst are being formed and continues as long as chlorine is being inducted, even after the chlorination has been discontinued, for a certain period of time owing to the presence of dissolved chlorine and to the action of the catalyst. The hydrogen chloride may be recovered and employed for useful purposes. In order to bring to completion the chlorination and the evolution of hydrogen chloride, the compound may be maintained at a higher temperature until cessation of the evolution of hydrogen chloride gas.

The reaction or polymerized product is cooled or allowed to cool. The product formed by using aluminum or iron as a catalyst is a viscous, dark-brown, oily liquid containing the catalyst. When magnesium or copper have been employed the reaction product generally is less viscous and lighter in color.

To render the catalyst more readily removable, it is usually preferable to reduce the viscosity of the product by the addition of a suitable diluent or solvent. Particularly suitable for this purpose are hydrocarbon fractions containing unsaturated and/or aromatic constituents, as mentioned in this particular example, but other solvents, such as ethyl acetate or carbon tetrachloride may also be employed. When the viscosity of the product permits easy handling of the mixture there is no need for any diluent. The sole purpose and function of the addition of these substances is to facilitate the removal of the catalyst by reducing the viscosity.

The catalyst and the hydrogen chloride dissolved in the product may be removed in different ways, well known to the art, and described in the advanced text books on preparative organic chemistry. Some of the methods I have used are disclosed in this and the following examples.

The yield of solid resin in this example amounts to 88% by weight of the raw material used but may be still somewhat increased. The yield, in general, increases the farther the chlorination is continued. For practical reasons, however, the chlorination has to be discontinued when the mixture becomes so viscous that effective mixing is rendered difficult.

The distillate from the removal of volatile constituents may be recovered and employed for useful purposes.

*Example 2*

18 parts by weight of a light gasoline fraction of American origin, boiling between 70° and 120° C., having a specific gravity of 0.720 and a bromine number of 0, were mixed with 22 parts of benzol having a freezing point of −5° C. This mixture was chlorinated by induction of gaseous chlorine in the presence of 1.2 parts by weight of aluminum powder at a temperature of 15° C. After 5 hours of chlorination the reaction mixture showed an increase in weight of 25 parts while simultaneously 35 parts of hydrogen chloride had been absorbed in an absorption vessel filled with water. The dark brown reaction product, apparently homogeneous, was poured into 24 parts by weight of a mixture containing ethyl alcohol and a 25 per cent aqueous solution of ammonia in the ratio 2:1, while agitating the mixture. After centrifugating, the liquid layers were separated from the precipitated salts, and from each other, whereupon the resin solution was dehydrated with calcium oxide at a temperature of 90° C. for 2 hours. After filtration, volatile constituents were removed from the filtrate by distillation as set forth in Example 1. The vacuum distillate consisted of an oily liquid and of sublimating crystals soluble in the liquid while in the distillation vessel remained 12 parts by weight of a reddish brown resin having a low melting point. A solution of this resin in a suitable solvent dries to a light yellow film having properties similar to those of the product described in Example 1.

*Example 3*

100 parts by weight of a fraction of a petroleum product prepared by catalytic condensation at 621° to 649° C. (1150° to 1200° F.) of gases formed by vapor phase cracking of petroleum, said fraction boiling between 50° and 200° C. at atmospheric pressure and having a specific gravity of 0.830 and a bromine number of 0.474 were chlorinated under vigorous agitation by induction of gaseous chlorine in the presence of 3.2 parts by weight of aluminum powder, the reaction temperature being maintained between 30° and 35° C. by cooling. After 3 hours the reaction mixture showed an increase in weight of 88 parts while 120 parts by weight of hydrogen chloride had been evolved. In order to reduce the viscosity of the product 30 parts by weight of ethyl acetate were added and the solution was poured, with agitation, into 40 parts by weight of a mixture containing ethyl alcohol and a 25 per cent aqueous solution of ammonia in the ratio 1:2. Ammonia was added until present in excess. The solution was dehydrated with anhydrous calcium chloride and filtered hot. The filtrate contained considerable quantities of chlorinated benzols, which were removed by cooling and filtration. A sample of the filtrate applied to glass in a thin layer dried in 24 hours to a hard film. From the filtrate volatile constituents were removed by distillation, as set forth in Example 1. 56 parts of a brown resin were obtained, which had the same solubility properties as the resin described in Example 1.

*Example 4*

100 parts by weight of a polycondensate prepared by catalytic condensation at 621° to 649° C. (1150° to 1200° F.) of the gaseous by-products from the operation of cracking gasoil in liquid phase under high pressure, boiling between 35° and 200° C. at atmospheric pressure and having a specific gravity of 0.78 and a bromine number of 0.924 were chlorinated under vigorous agitation by induction of gaseous chlorine in the presence of 3.3 parts by weight of aluminum powder the reaction temperature being maintained between 30° and 35° C. by cooling. The chlorination was discontinued when the reaction mixture showed an increase in weight of 45 parts and 70 parts by weight of hydrogen chloride had been evolved. To the viscous product were added 40 parts by weight of a mixture containing ethyl alcohol and a 25 per cent aqueous solution of ammonia in the ratio 1:2. As diluent 35 parts by weight of ethyl acetate were used. The solution was dehydrated with anhydrous calcium chloride. After centrifuging the resin solution was filtered. A sample of the filtrate applied to glass in a thin layer dried in 24 hours to a hard, translucent film.

Example 5

100 parts by weight of a fraction of a hydrocarbon polycondensate prepared by catalytic condensation at 566° to 593° C. (1050° to 1100° F.) of the gaseous by-products from vapor phase cracking of petroleum, said fraction boiling between 40° and 200° C. at atmospheric pressure, and having a specific gravity of 0.79 and a bromine number of 1.308, were chlorinated with vigorous agitation by induction of gaseous chlorine in the presence of 3 parts by weight of aluminum powder. The reaction temperature was maintained at 30° by cooling. The chlorination was discontinued when the reaction mixture showed an increase in weight of 87 parts and 102 parts by weight of hydrogen chloride had been evolved. To the almost solid product 35 parts by weight of ethyl acetate were added the solution was neutralized by the addition of a slight excess of a mixture of one part by weight of ethyl alcohol and two parts by weight of 25% aqueous ammonium hydroxide. The resin solution was dried with anhydrous calcium chloride centrifugated, and then filtered. A sample of the filtrate applied to a surface dried in 24 hours to a hard reddish brown and translucent film.

Example 6

100 parts by weight of a raw distillate obtained from high pressure liquid phase cracking of gas-oil, boiling entirely below 300° C. at atmospheric pressure, and having a specific gravity of 0.74 and a bromine number of 0.492, were chlorinated with vigorous agitation by induction of gaseous chlorine in the presence of 3.6 parts by weight of aluminum powder. The reaction temperature was maintained between 30° and 35° C. by cooling. After 5 hours of chlorination the reaction mixture showed an increase in weight of 72 parts and 170 parts by weight of hydrogen chloride had been evolved. 25 parts by weight of ethyl acetate were added and the solution was poured into 45 parts by weight of a mixture containing ethyl alcohol and a 25 per cent aqueous solution of ammonia in the ratio of 1:2, whereupon ammonia was added until present slightly in excess of the amount required for neutralization. The mixture was dehydrated with anhydrous calcium chloride. The resin solution thus obtained was centrifugated, and then filtered. A sample of the filtrate applied to a glass surface dried in two days to form a hard, brown film.

Example 7

100 parts by weight of a light gasoline fraction boiling between 32° and 65° C. at atmospheric pressure and having the bromine number 0, and the specific gravity 0.63, thus containing substantially saturated hydrocarbons of aliphatic character were chlorinated by induction of gaseous chlorine in the presence of 3.2 parts by weight of aluminum powder at a temperature of 5° C. during 11 hours. The heterogeneous product consisting of a colorless oil and a brown mass was treated with an excess of a 25 per cent aqueous ammonia solution. The resin was dissolved by adding benzol, the solution was separated, dehydrated with anhydrous calcium chloride and filtered, whereupon the volatile constituents were removed by distillation as set forth in Example 1. The yield was 15 parts of a brown translucent resin.

Example 8

100 parts by weight of the hydrocarbon material used as raw material in Example 1, were chlorinated by induction of gaseous chlorine at a temperature of 30° C. in the presence of 2.4 parts of magnesium filings. The mixture was agitated throughout this chlorination step. After 1 hour of chlorination 38 parts by weight of chlorine had been absorbed, while simultaneously 24 parts by weight of hydrogen chloride had been evolved. The resulting product was neutralized with a sodium hydroxide solution, separated from this neutralizing agent, dried with anhydrous calcium chloride, and filtered. A sample of the chlorinated product was applied to glass and hardened on drying at a temperature of 100° C. for 5 hours to an almost colorless and hard film.

Example 9

100 parts by weight of a light gasoline fraction boiling between 60° and 85° C. at atmospheric pressure and having the specific gravity 0.672 and the bromine number 0 were chlorinated by induction of gaseous chlorine at a temperature of 30° C. in the presence of 5 parts by weight of finely powdered aluminum chloride. After 6 hours of chlorination the heterogeneous product, consisting of dark aluminum chloride compounds and a colorless liquid, was neutralized with a mixture of 20 parts by weight of hydrated lime and 11 parts of water. 20 parts by weight of ethyl acetate were added and after centrifuging the resin solution was filtered. A sample of the filtrate applied to glass dried in 48 hours to a hard, brown and translucent film.

Example 10

100 parts of a turpentine, freshly distilled, boiling between 154° and 160° C. at atmospheric pressure and having the specific gravity 0.865 and the bromine number 1.1 were chlorinated by induction of gaseous chlorine during 4 hours in the presence of 1.6 parts of aluminum powder while agitating the mixture. During the first hour the temperature was maintained at about 50° C. but was then increased to 70° C. by heating. 92 parts by weight of chlorine were absorbed and 48 parts by weight of hydrogen chloride were evolved. The viscous product was neutralized with a mixture of a 25 per cent aqueous ammonia solution and ethyl alcohol in the ratio 1:2. The resulting product was thinned with ethyl acetate, dried with anhydrous calcium chloride, centrifugated and filtered. A sample of the product was applied to glass and dried for 10 hours at a temperature of 100° C. A light brown hard, tenacious and translucent film remained.

Further tests were carried out with narrower fractions of the raw materials mentioned above. These tests included experiments with fractions of each of the hydrocarbon products described in the above Examples 1, 3, 4, 5, 6, these fractions boiling between 30° and 50° C., 50° and 60° C., 60° and 74° C., 92° and 128° C., 140° and 160° C., 160° and 183° C., 190° and 210° C., 210° and 240° C., and 240° and 300° C., at atmospheric pressure. The results of this experimental work proved that the process disclosed herein operates over this entire range of raw materials, and that the results are not greatly dependent upon the specific fraction selected, or on the narrowness of the fraction. That these widely different fractions of raw materials are satisfactory for the purposes of this invention illustrates that the reaction is of very general applicability, and that it is not dependent on any particular chemical entity or entities. The wide variation in chemical structure between the substances contained in the various fractions having different boiling ranges, is well known in the art. However, from a practical commercial standpoint, I prefer to use fractions of a wide boiling range as raw materials, a substantial part of which boils in the range of from 30° to 240° C. and having a bromine number of 0.2 or more but as stated above the process works as well with saturated hydrocarbons.

The products of the invention are suitable for the manufacture of paints and varnishes, as well as for impregnation compounds, and this invention contemplates their use in conjunction with all other compatible paint or lacquer ingredients, or antiseptic or fungicide agents, known to the art.

From the foregoing disclosure it is apparent that the invention is capable of wide variations and modifications within wide limits, depending upon the particular applications contemplated, raw materials available, the properties desired in the final end product, and other similar factors. The foregoing examples are not to be construed in any sense of limitation, but are given merely to illustrate the invention; which is to be limited only by the claims which follow, in which it is intended to claim all novelty inherent in this invention as broadly as possible, in view of the prior art.

I claim:

1. A composition of matter comprising the product of the process which comprises chlorinating, to a chlorine content of at least 10%, in the presence of metallic magnesium, a vapor phase cracked petroleum product, boiling substantially between 30° and 220° and having a bromine number of at least 0.4 and then polymerizing the chlorinated material.

2. A composition of matter comprising the product of the process which comprises chlorinating, to a chlorine content of at least 10% in the presence of metallic magnesium, a hydrocarbon material obtained by catalytic polymerization of hydrocarbon materials normally gaseous, and distillable substantially within a range of 35° to 200° C. at atmospheric pressure, and having bromine number of at least 0.2, and then polymerizing the chlorinated material.

3. A composition of matter comprising the product of the process which comprises chlorinating a petroleum hydrocarbon boiling substantially between 30° and 220° centigrade, and having a bromine number of at least 0.2, in the presence of metallic magnesium, until the chlorine content is at least about 30%, and polymerizing the chlorinated material by continual contact with said catalyst until substantial cessation of evolution of hydrogen chloride.

4. A composition of matter comprising the product of the process which comprises chlorinating a petroleum hydrocarbon boiling substantially between 30° and 220° C., and having a bromine number of at least 0.2, in the presence of metallic magnesium, until the chlorine content is at least about 10%, and then polymerizing the chlorinated material until substantial cessation of evolution of hydrogen chloride.

TOR SMEDSLUND.